Nov. 4, 1947.  A. E. RUTTER  2,430,143
TRACTOR HITCH FOR PLOWS
Filed Nov. 8, 1944  2 Sheets-Sheet 1

Inventor
Alvah E. Rutter
By Thiess, Olsen & Mecklenburger
Attys.

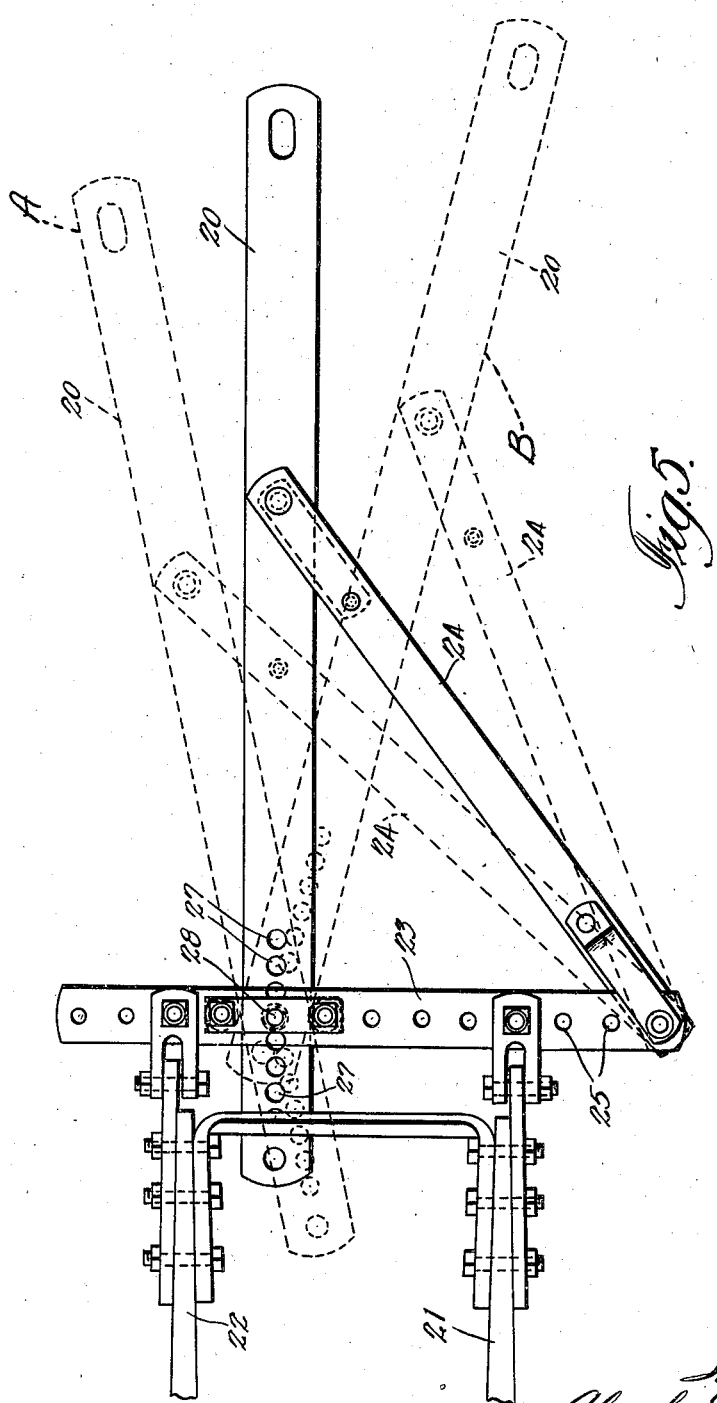

Patented Nov. 4, 1947

2,430,143

UNITED STATES PATENT OFFICE 2,430,143

TRACTOR HITCH FOR PLOWS

Alvah E. Rutter, Rockford, Ill., assignor to J. I. Case Company, Racine, Wis., a corporation of Wisconsin Application November 8, 1944, Serial No. 562,430

11 Claims. (Cl. 280—33.44)

The invention relates to adjustable draft mechanisms and more particularly to tractor hitches for wheeled tractor-drawn plows which will enable the direction of the drawbar pull with respect to the plow to be changed, and it is an object of the invention to provide an improved tractor hitch of the character indicated.

It is a further object of the invention to provide a tractor hitch of the character indicated in which the adjustability may be performed by the driver while sitting in the seat of the tractor.

Further objects and advantages of the invention will be apparent from the description and claims.

For a more complete understanding of the invention reference should be had to the accompanying drawing, in which:

Fig. 5 is a plan view of the hitch on a larger scale than in Fig. 1.

Figure 1:
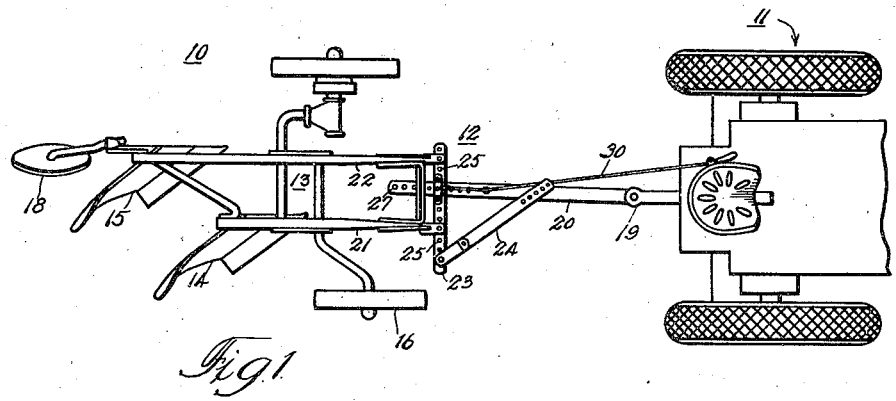
Figure 1 is a plan view of a tractor, plow, and hitch embodying the invention.
Figure 2:
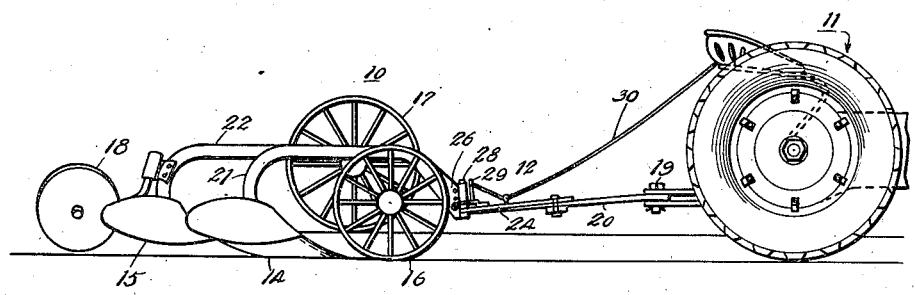
Fig. 2 is an elevational view of the tractor and plow shown in Fig. 1.

Referring to the drawings, the invention is shown embodied in a gang plow 10 which may be of any suitable construction, the plow being drawn by a tractor 11, which may be of any well-known type, through an adjustable tractor hitch 12 connecting the plow to the tractor. The plow 10 comprises a frame 13 on which the plowshares 14 and 15 are mounted, a front furrow wheel 16 travelling in the furrow which has previously been plowed about three or four inches from the furrow wall and adjustable up and down from working to transport position, a land wheel 17 adjustable up and down to change the depth of cut and to secure a level cut, and a rear caster wheel 18 travelling in the rear furrow which has just been plowed adjacent the furrow wall. The tractor has a clevis-like laterally adjustable hitch 19 to which the front end of the drawbar 20 is secured.

The frame 13 comprises two longitudinally extending beam members 21 and 22 having downward and forward extensions connected with the horizontal transversely extending anchorage bar 23 of the hitch 12 which comprises the transversely extending anchorage bar 23, drawbar 20 and also a brace or strut member 24 pivotally connected at its rear end adjacent one end of the anchorage bar and pivotally connected at its forward end intermediate the ends of the drawbar 20. The anchorage bar 23 has a plurality of adjustment holes 25 to provide for lateral adjustment of the anchorage bar with respect to the plow beams 21 and 22, and extensions of the plow beams 21 and 22 preferably have a plurality of holes 26 to provide for vertical adjustment of the anchorage bar.

To enable the line of draft of the drawbar with respect to the frame of the plow to be changed, the drawbar is provided with a plurality of holes 27 in any one of which a vertically slidable pin 28 carried by the anchorage bar 23 may be inserted to hold the drawbar in various positions of longitudinal adjustment with respect to the anchorage bar.

Referring to Figs. 1 and 5, it will be seen that a rearward adjustment of the drawbar 20, with respect to the anchorage bar 23, to the position A in Fig. 5, will throw the front end of the drawbar toward the land side, or, in other words, will throw the front ends of the plow beams toward the furrow side, and that a forward adjustment of the drawbar 20, with respect to the anchorage bar 23, to the position B, will throw the front end of the plow frame 13 toward the land side.

In order to enable the driver of the tractor to effect an adjustment of the line of drawbar pull without leaving the seat of the tractor, a pin releasing bell crank lever 29 is provided, to the upper end of one arm of which is secured a pull cable or cord 30 which may be secured to some part of the tractor in such a way that it can be conveniently reached by the driver of the tractor.

Figure 4:
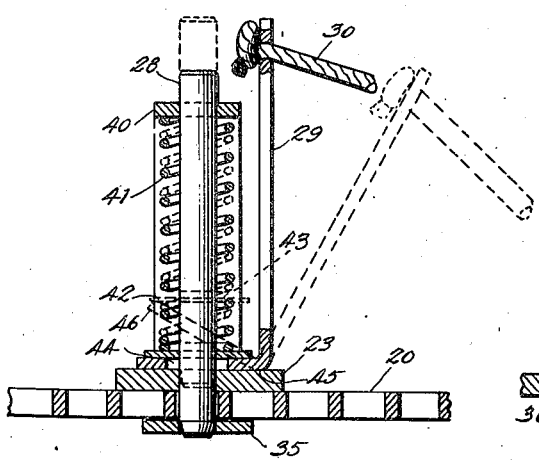
Fig. 4 is a sectional view taken substantially along the lines 4—4 of Fig. 3.
Figure 3:
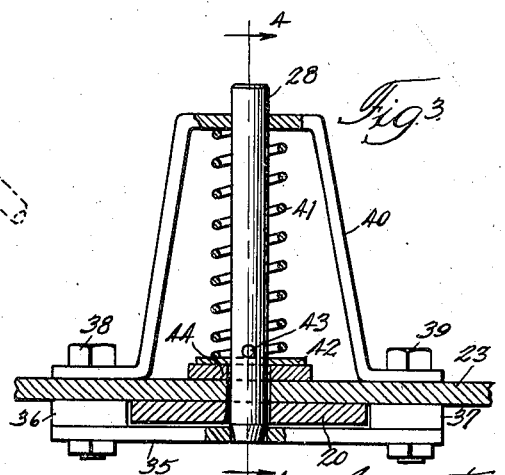
Fig. 3 is an enlarged view partially in section of a hitch embodying the invention.

The drawbar 20 is mounted and guided for sliding movement with respect to the anchorage bar 23 by means of a bracket 35 secured to the under side of the anchorage bar 23 and spaced therefrom, the drawbar moving in the space between the anchorage bar 23 and the bracket 35 and being held against lateral movement with respect to the anchorage bar by means of spacing collars 36 and 37 on the bolts 38 and 39 which secure the bracket 35 to the anchorage bar 23. The connecting pin 28 is slidable vertically and guided by registering openings in the anchorage bar 23 and bracket 35. Its upper end is further supported by a U-shaped bracket 40 secured to the anchorage bar 23 by the same bolts which hold the guide bracket 35 in position. The connecting pin 28 is urged to connecting position by a coil compression spring 41 surrounding the pin. The upper end of the spring 41 bears against the upper portion of the U-shaped bracket 40 and its lower portion bears against a collar 42 secured rigidly to the pin 28 by a pin 43 or some other suitable means. The bell crank lever 29 for releasing the pin 28 from connecting position is provided with a slot 44 through which the pin extends, the slot 44 providing clearance enough so that the bell crank lever can be tilted about its fulcrum at 45 from the position shown in full lines in Fig. 4 to the position shown in dotted lines. In this movement, the edge 46 of the bell crank lever 29 bears upwardly against the collar 42 secured to the pin 28 and slides somewhat thereon, the fulcrum portion of the lever 29 also sliding, if necessary, on the anchorage bar 23.

In use, if the operator of the tractor thinks it advisable to change the line of draft, he pulls on the cord 30 to release the pin 28 from connecting position, inches the tractor backward or forward to give the desired change of direction of the drawbar pull, and then releases the cord 30 to enable the pin 28 to snap into the desired opening in the drawbar 23.

While I have shown a particular embodiment of my invention, it will be understood, of course, that I do not wish to be limited thereto since many modifications may be made and I therefore contemplate by the appended claims to cover any such modifications as come within the true spirit and scope of my invention.

Having thus described my invention, what I claim and desire to secure by Letters Patent is:

1. In a wheeled tractor-drawn plow, a tractor hitch comprising an anchorage bar extending horizontally and transversely of the line of draft, a unitary drawbar having its rear end guidedly mounted for longitudinal movement across said anchorage bar, means for connecting and releasing the rear end of said drawbar with respect to said anchorage bar in any one of a plurality of longitudinally adjusted positions, and a brace link pivotally connected at one end to said anchorage bar and extending forwardly therefrom and pivotally connected at its other end to said drawbar whereby longitudinal adjustment of the drawbar with respect to the anchorage bar will change the line of draft with respect to the plow.

2. In a wheeled tractor-drawn plow, a tractor hitch comprising an anchorage bar extending horizontally and transversely of the line of draft, a unitary drawbar having its rear end guidedly mounted for longitudinal movement across said anchorage bar, means for connecting and releasing the rear end of said drawbar for longitudinal movement with respect to said anchorage bar in any one of a plurality of longitudinally adjusted positions, and a brace link pivotally connected at one end to said anchorage bar and extending forwardly therefrom and pivotally connected at its other end to said drawbar whereby longitudinal adjustment of the drawbar with respect to the anchorage bar will change the line of draft with respect to the plow, said connecting and releasing means including remotely controllable means operable by the driver in the tractor seat whereby the driver may release the drawbar, inch the tractor forward or backwad to change the line of draft, and connect the drawbar.

3. In a wheeled tractor-drawn plow, a tractor hitch comprising an anchorage bar extending horizontally and transversely of the line of draft, a unitary drawbar having its rear end guidedly mounted for longitudinal movement across said anchorage bar, means for connecting and releasing the rear end of said drawbar with respect to said anchorage bar in any one of a plurality of longitudinally adjusted positions, and a brace link pivotally connected at one end to said anchorage bar and extending forwardly therefrom and pivotally connected at its other end to said drawbar whereby longitudinal adjustment of the drawbar with respect to the anchorage bar will change the line of draft with respect to the plow, said connecting and releasing means including remotely controllable spring-connected pull-released means operable by the driver in the tractor seat whereby the driver may release the drawbar, inch the tractor forward or backward to change the line of draft, and connect the drawbar.

4. In a wheeled tractor-drawn plow, a tractor hitch comprising an anchorage bar extending horizontally and transversely of the line of draft, a drawbar guidedly mounted for longitudinal movement transversely with respect to said anchorage bar, means for connecting and releasing said drawbar for longitudinal movement with respect to said anchorage bar in any one of a plurality of longitudinally adjusted positions, and a brace link pivotally connected at one end to said anchorage bar and extending forwardly therefrom and pivotally connected at its other end to said drawbar whereby longitudinal adjustment of the drawbar with respect to the anchorage bar will change the line of draft with respect to the plow, said connecting and releasing means including a pin slidably mounted on said anchorage bar for selective engagement with openings in the drawbar, a coil spring surrounding said pin urging the pin to connecting position, and a bell crank lever, one arm of which shifts the pin to releasing position against the action of said spring.

5. In a wheeled tractor-drawn plow, a tractor hitch comprising an anchorage bar extending horizontally and transversely of the line of draft, a drawbar guidedly mounted for longitudinal movement transversely with respect to said anchorage bar, means for connecting and releasing said drawbar for longitudinal movement with respect to said anchorage bar in any one of a plurality of longitudinally adjusted positions, and a brace link pivotally connected at one end to said anchorage bar and extending forwardly therefrom and pivotally connected at its other end to said drawbar whereby longitudinal adjustment of the drawbar with respect to the anchorage bar will change the line of draft with respect to the plow, said connecting and releasing means including a pin slidably mounted on said anchorage bar for selective engagement with openings in the drawbar, a coil spring surrounding said pin urging the pin to connecting position, a bell crank lever, one arm of which shifts the pin to releasing position against the action of said spring, and a flexible pull member connected to the other arm of said bell crank member.

6. In a wheeled tractor plow having a frame, a unitary drawbar having its rear end guidedly mounted for longitudinal movement with respect to said frame, means for connecting and releasing the rear end of said drawbar with respect to said frame in any one of a plurality of longitudinally adjustable positions, and a brace link pivotally connected at one end to said frame at a point spaced laterally from the guided mounting of said drawbar, said brace extending forwardly therefrom and being pivotally connected at its other end to said drawbar whereby longitudinal adjustment of the drawbar with respect to the frame will cause lateral shifting of the plow relatively to the tractor.

7. In a latch for a longitudinally adjustable member, a stationary bar, a bracket secured to and projecting from the stationary bar, a latch pin slidable in said stationary bar and bracket, resilient means urging the latch pin in one direction, a bell crank lever having an arm having an opening through which said pin extends, and a fulcrum portion resting on said stationary bar, abutment means on said pin and engaged by said arm upon rocking of said lever on said fulcrum portion, and said lever being maintained in position solely by engagement of said arm with said pin and abutment, and pulling means extending from said bell crank for actuation from a remote point.

8. In a wheeled tractor-drawn plow, a tractor hitch comprising a unitary drawbar having tractor connection means at its front end and a plurality of longitudinally spaced selectively connectable and disconnectable plow connection means at its rear end, means for slidably guiding the rear end of said bar for longitudinal movement, and a brace link having its front end pivotally connected with an intermediate portion of said unitary drawbar and having pivotal plow connection means at its rear end.

9. In a wheeled tractor-drawn plow, a tractor hitch comprising a unitary drawbar having tractor connection means at its front end and a plurality of longitudinally spaced selectively connectable and disconnectable plow connection means at its rear end, means for slidably guiding the rear end of said bar for longitudinal movement, and a brace link having its front end pivotally connected with an intermediate portion of said unitary drawbar and having pivotal plow connection means at its rear end, said selective means comprising remotely controllable means operable by the driver in the tractor seat whereby the driver may release the drawbar from the plow, inch the tractor forward or backward to change the line of draft, and connect the drawbar.

10. In a wheeled tractor-drawn plow, a tractor hitch comprising a unitary drawbar having tractor connection means at its front end and a plurality of longitudinally spaced selectively connectable and disconnectable plow connection means at its rear end, means for slidably guiding the rear end of said bar for longitudinal movement, and a brace link having its front end pivotally connected with said unitary drawbar and having pivotal plow connection means at its rear end.

11. In a wheeled tractor-drawn plow, a tractor hitch comprising a unitary drawbar having tractor connection means at its front end and a plurality of longitudinally spaced selectively connectable and disconnectable plow connection means at its rear end, means for slidably guiding the rear end of said bar for longitudinal movement, and a brace link having its front end pivotally connected with said unitary drawbar and having pivotal plow connection means at its rear end, said selective means comprising remotely controllable means operable by the driver in the tractor seat whereby the driver may release the drawbar from the plow, inch the tractor forward or backward to change the line of draft, and connect the drawbar.

ALVAH E. RUTTER.

REFERENCES CITED

The following references are of record in the file of this patent:

UNITED STATES PATENTS

| Number | Name | Date |
|---|---|---|
| 1,436,595 | McKay | Nov. 21, 1922 |
| 1,233,849 | Culhane | July 17, 1917 |

FOREIGN PATENTS

| Number | Country | Date |
|---|---|---|
| 175,503 | Great Britain | Feb. 23, 1922 |